Figure 1:
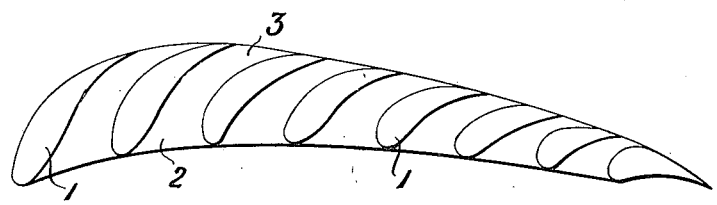

June 3, 1924.

F. H. PAGE

WING FOR AIRCRAFT

Original Filed May 14, 1921

1,496,733

Patented June 3, 1924.

1,496,733

UNITED STATES PATENT OFFICE.

FREDERICK HANDLEY PAGE, OF LONDON, ENGLAND, ASSIGNOR TO HANDLEY PAGE LIMITED, OF LONDON, ENGLAND.

WING FOR AIRCRAFT.

Original application filed May 14, 1921, Serial No. 469,402. Divided and this application filed August 14, 1922. Serial No. 581,824.

*To all whom it may concern:*

Be it known that I, FREDERICK HANDLEY PAGE, a subject of the King of Great Britain, residing at London, England, have invented certain new and useful Improvements in Wings for Aircraft, of which the following is a specification.

The present invention is a division of my patent application Serial No. 469,402 filed 14th May 1921 relating to wings for aircraft.

In the specification of United States Patent No. 1,353,666 dated 21st September 1920, a wing structure for aircraft has been described which was to be constructed with a small forwardly located auxiliary wing, or small auxiliary wings all forwardly located in the wing structure, and which forwardly located auxiliary wing or wings were separated from the main wing and from each other, where more than one auxiliary wing was employed, in order to produce in the forward part of the wing structure a comparatively narrow through slot or slots extending substantially throughout the wing in a direction transversely of the line of flight, said auxiliary wing having its nose located at the approximate level of the nose of the main wing, and said auxiliary wing having its angle of incidence less than the angle of incidence of the main wing so as to mask the leading portion of the main wing.

A characteristic feature of the invention therefore consisted in the provision of the main wing, and then constructing one or a plurality of small forwardly located auxiliary wings, arranged one behind the other and separated from each other and from the main wing to produce a plurality of forwardly located through slots as aforesaid.

The object of the invention described in the specification No. 1,353,666 as therein stated was to overcome what is known as the burbling effect of the air on the forward portion of the upper surface of a wing, and it was explained as being already known that when a wing is inclined at an angle to the air through which it passes, the lift coefficient of such a wing increases with the increase of its angle up to a certain critical angle, which I had found was between 12° and 25°, and that beyond that angle the suction effect suddenly became greatly diminished and that this phenomenon I had found was due to the fact that the steady air stream over the top of the plane causing the air suction was suddenly replaced by an eddying mass of air over the forward portion of the wing breaking up into a series of eddies whereby the suction effect was lost, and which phenomenon has been termed a burbling.

The object therefore sought to be attained by my invention, the subject of Patent No. 1,353,666, was to prevent the "burbling" at the front or leading portion of the wing, hence in the patent aforesaid the monopoly claimed related to the provision of the small auxiliary wing or wings "forwardly located" relatively to the main wing, and this invention has been proved eminently successful in attaining the object aimed at.

Since the date of this aforesaid Patent No. 1,353,666, I have found that beyond preventing "burbling" above the forwardly located portion of the wing, an advantageous effect was obtained by the interaction of one auxiliary plane upon another, that is, that if the whole wing, or wing structure as it is hereafter termed, was composed from the front edge to the rear edge of a number of auxiliary wings, or as hereafter termed wing sections, interaction would occur between them and a greatly improved lifting effect at big angles could be obtained.

In explanation I would state, that at the front edge of a plane the air rushes over the upper surface at great velocity and slows down towards the rear edge, and I have found that if the rear edge of any plane be placed above the front edge of a succeeding plane, the velocity of the air passing over the rear upper edge of the front plane is increased and the velocity of the air passing over the upper front portion of the rear plane is decreased, and therefore by constructing a wing structure as hereafter described the velocity of the air over the whole wing structure is equalized throughout and formation of eddies is prevented.

- Now according to the present invention I construct what I have termed a wing structure of a form as illustrated and which may be described as having a convex upper surface and a concave lower surface with a bluff nose connecting these upper and lower curves at the leading edge and a taper tail coming to a point at the after end and in which the thickness or distance between the surfaces increases quickly at the nose until it attains the maximum thickness and diminishes therefrom gradually, continuously and without irregularities until the point of the of the tail is reached. This wing structure is wholly comprised by a plurality of wing sections each of wing form, all extending transversely of the direction of flight, one located rearward of the other from the leading edge to the trailing edge of said wing structure and separated from each other to form comparatively narrow through slots each extending in a direction transversely of the line of flight, the opening of each slot on the under side of said wing structure being located in advance of the opening of the same slot on the upper side of said wing structure, each slot formed between said wing sections having its opening on the upper surface of said wing structure less in width in the direction of the line of flight than its opening on the under side of said wing structure, all said wing sections being contained within a contour line of wing form surrounding said wing structure with which contour line portions of the surfaces of each wing section contact, all said wing sections combining to make up the contour of a whole wing structure.

By such a construction, as distinguished from the invention described in Patent No. 1,353,666, I have found that the velocity of the air over the whole of the upper surface of the wing structure becomes more or less equalized throughout and the formation of eddies, not only over the forwardly located upper surface, but over the whole upper surface of the wing structure is prevented, and the efficiency of the wing structure is thus greatly increased.

The invention will be further described with reference to the accompanying drawings.

Figure 2:
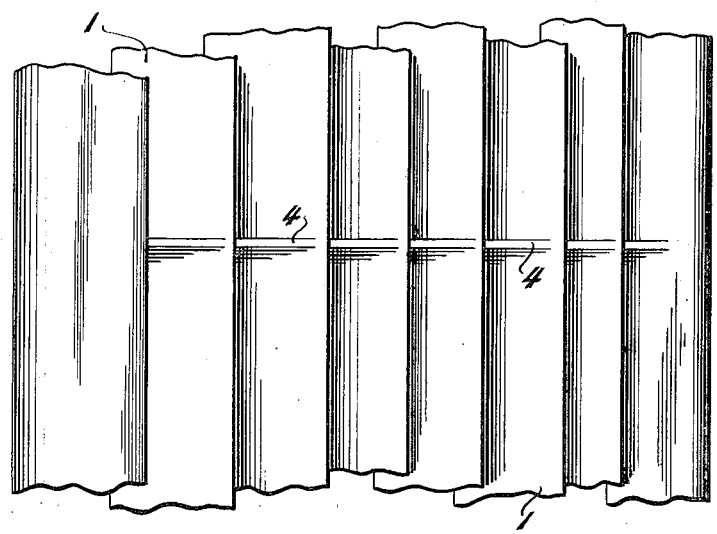

Fig. 1 shows a diagram sectional view of a wing structure for aircraft, composed of a plurality of wing sections, and Fig. 2 is a part plan view of the structure shown at Fig. 1.

Referring to the drawings, the wing structure shown consists of a plurality of wing sections 1 each of wing form and extending transversely to the longitudinal axis of the machine as indicated at Fig. 2, the said wing sections being separated from each other to form slots, the openings 2 of said slots on the underside of the wing structure being in advance of the openings 3 of said slots on the upper side, and it will be observed that all such wing sections 1 combine to make up the contour of the whole wing structure shown, the contour line of the said wing structure contacting with the wing sections, the said contour being convex on its upper side and concave on its lower side.

The wing sections 1 are shown in the drawing in fixed relative positions to each other and are arranged in tandem from the leading edge to the trailing edge of the wing structure, and at Fig. 2 a portion of a wing rib 4 is indicated. In the specification of my United States Patent No. 1,353,666 hereinbefore referred to, it was explained that means were provided whereby the slots formed between what were termed the auxiliary wings and the main wing could be mechanically closed by the aviator while in flight, it being advantageous in a high performance machine having a normal high speed of landing, to reduce the landing speed by opening the slots, the latter at other times being closed; and it was further explained in the aforesaid specification that what were termed the auxiliary wings might be pivoted so as to be capable of being moved into contact with each other and with the rearward wing. In the present invention it is obvious that if desired the wing sections 1 could be similarly pivoted to the framework by which they are supported so that they could be turned about their pivots in order to open or close the slots between them.

What I claim as my invention and desire to secure by Letters Patent is:—

1. A wing structure for aircraft, comprised by a plurality of wing sections each of wing form, having a convex upper surface and a concave lower surface with a bluff nose connecting these upper and lower curves at the leading edge and a taper tail coming to a point at the after end and in which the thickness or distance between the surfaces increases quickly at the nose until it attains the maximum thickness and diminishes therefrom gradually, continuously and without irregularities until the point of the tail is reached all extending transversely to the direction of flight, one located rearward of the other from the leading edge to the trailing edge of said wing structure and separated from each other to form comparatively narrow through slots each extending in a direction transversely of the line of flight, the openings of said slots on the under side of said wing structure being located in advance of the openings of said slots on the upper side of said wing structure, all said wing sections being contained within and defining a contour line of the same wing form surrounding said wing structure with which contour line portions of the surfaces of each wing section contact, all said wing sections combining to make up the contour of a whole wing structure.

2. A wing structure for aircraft, comprised by a plurality of wing sections each of wing form, having a convex upper surface and a concave lower surface with a bluff nose connecting these upper and lower curves at the leading edge and a taper tail coming to a point at the after end and in which the thickness or distance between the surfaces increases quickly at the nose until it attains the maximum thickness and diminishes therefrom gradually, continuously and without irregularities until the point of the tail is reached all extending transversely to the direction of flight, one located rearward of the other from the leading edge to the trailing edge of said wing structure and separated from each other to form comparatively narrow through slots each extending in a direction transversely of the line of flight, the opening of each slot on the under side of said wing structure being located in advance of the opening of the same slot on the upper side of said wing structure, each slot formed between said wing sections having its opening on the upper surface of said wing structure less in width in the direction of the line of flight than its opening on the under side of said structure, all said wing sections being contained within and defining a contour line of the same wing form surrounding said wing structure with which contour line portions of the surfaces of each wing section contact, all said wing sections combining to make up the contour of a whole wing structure.

3. A wing structure for aircraft, comprised by a plurality of wing sections each of wing form, having a convex upper surface and a concave lower surface with a bluff nose connecting these upper and lower curves at the leading edge and a taper tail coming to a point at the after end and in which the thickness or distance between the surfaces increases quickly at the nose until it attains the maximum thickness and diminishes therefrom gradually, continuously and without irregularities until the point of the tail is reached all extending transversely to the direction of flight, one located rearward of the other from the leading edge to the trailing edge of said wing structure each wing section being masked by the wing section immediately preceding it, said wing sections being separated from each other to form comparatively narrow through slots each extending in a direction transversely of the line of flight, the openings of said slots on the under side of said wing structure being located in advance of the openings of said slots on the upper side of said wing structure, all said wing sections being contained within and defining a contour line of the same wing form surrounding said wing structure with which contour line portions of the surfaces of each wing section contact, all said wing sections combining to make up the contour of a whole wing structure.

In witness whereof I have hereunto set my hand in the presence of two witnesses.

FREDERICK HANDLEY PAGE.

Witnesses:
THOMAS WILLIAM ROGERS,
LESLIE FRANK ROGERS.